(12) United States Patent
Narayanan et al.

(10) Patent No.: US 11,766,699 B1
(45) Date of Patent: Sep. 26, 2023

(54) INTERCONNECTED SORTATION SYSTEMS WITH MULTIPLE INPUTS AND DESTINATIONS

(71) Applicant: Amazon Technologies, Inc., Seattle, WA (US)

(72) Inventors: Vivek S Narayanan, Sammamish, WA (US); Ganesh Krishnamoorthy, Seattle, WA (US); Mohit Malik, Seattle, WA (US); Rajeev Dwivedi, Sammamish, WA (US); Michael Alan Bray, Elkhorn, NE (US); Shahid Azad, Seattle, WA (US); Max Alfonso Bruccoleri, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 17/356,901

(22) Filed: Jun. 24, 2021

(51) Int. Cl.
| | |
|---|---|
| *B07C 3/08* | (2006.01) |
| *B65G 1/137* | (2006.01) |
| *B65G 1/04* | (2006.01) |
| *B65G 54/02* | (2006.01) |

(52) U.S. Cl.
CPC .............. *B07C 3/08* (2013.01); *B65G 1/0478* (2013.01); *B65G 1/137* (2013.01); *B65G 54/02* (2013.01)

(58) Field of Classification Search
CPC .......... B07C 3/08; B65G 54/02; B65G 1/137; B65G 1/0478
USPC ....................................................... 198/805
See application file for complete search history.

(56) References Cited

U.S. PATENT DOCUMENTS

| | | | | |
|---|---|---|---|---|
| 4,189,273 | A * | 2/1980 | Soderstrom .......... | B65G 1/1378 198/367 |
| 6,644,458 | B1 * | 11/2003 | Edslev-Christensen ..................... | B65G 47/50 198/465.1 |
| 8,798,784 | B1 * | 8/2014 | Clark ........................ | G06F 7/00 700/214 |
| 10,994,941 | B1 | 5/2021 | Dwivedi et al. | |
| 11,492,211 | B1 | 11/2022 | Bray et al. | |

(Continued)

FOREIGN PATENT DOCUMENTS

| | | | |
|---|---|---|---|
| CN | 115027862 A | 9/2022 | |
| EP | 2786946 * | 4/2013 | ............... B65G 1/04 |

(Continued)

OTHER PUBLICATIONS

IPO, "Combined Search and Examination Report" Application No. GB 2209125.0, dated Dec. 19, 2022, 6 pages.

*Primary Examiner* — James R Bidwell
(74) *Attorney, Agent, or Firm* — Eversheds Sutherland (US) LLP

(57) ABSTRACT

Systems and methods are disclosed for interconnected sortation systems with multiple inputs and destinations. In one embodiment, an example system may include a first sortation system, a second sortation system, a first induction station to induct items into the system, and a second induction station to induct items into the system. The system may include a track configured to connect the first sortation system to both the first induction station and the second induction station, and to connect the second sortation system to both the first induction station and the second induction station. The system may include a number of shuttles configured to move along the track.

20 Claims, 9 Drawing Sheets

(56) References Cited

U.S. PATENT DOCUMENTS

| | | | | |
|---|---|---|---|---|
| 2001/0030102 A1* | 10/2001 | Woltjer | ............. | B65G 47/1492 |
| | | | | 198/388 |
| 2007/0203612 A1* | 8/2007 | Mileaf | ..................... | B07C 3/08 |
| | | | | 700/216 |
| 2021/0371204 A1* | 12/2021 | Mutarelli | ............ | B65G 1/1371 |

FOREIGN PATENT DOCUMENTS

| EP | 2786946 A1 | 10/2014 |
|---|---|---|
| EP | 3038952 B1 | 7/2016 |

\* cited by examiner

INTERCONNECTED SORTATION SYSTEMS WITH MULTIPLE INPUTS AND DESTINATIONS

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
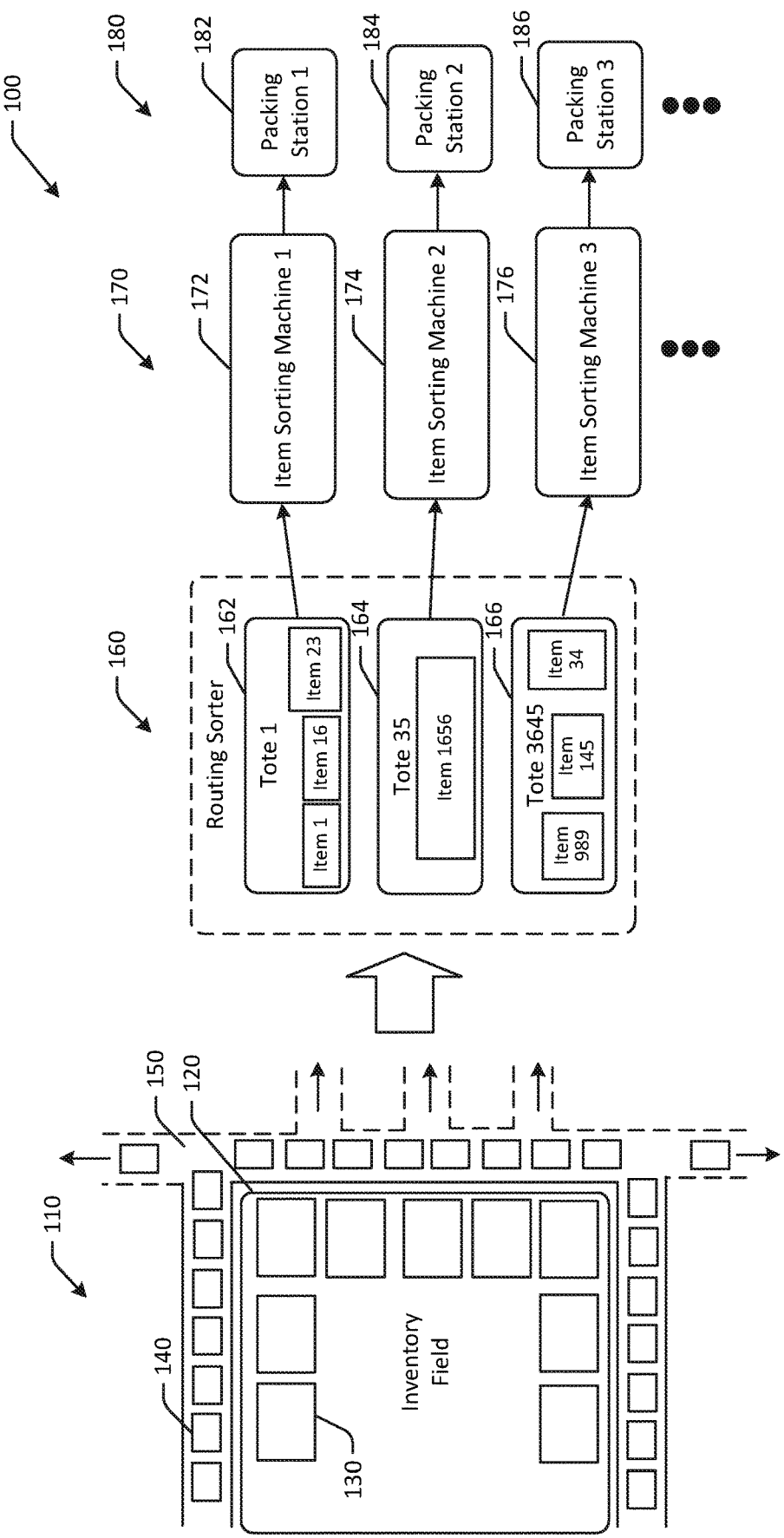
FIG. 1 is a hybrid schematic illustration of an example use case for interconnected sortation systems with multiple inputs and destinations in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location. For processing of items or packages, some systems may include multiple induction stations at which an item or package can be inducted into the system for downstream sortation. Such systems may include multiple sortation systems. Items may be routed from induction stations to sortation systems using shuttles. For example, items may be loaded into totes, and the totes may be transported using shuttles.

Typically, a sortation system may have a single induction point or single induction station at which items to be sorted by the sortation system may be inducted. Multiple sortation systems may be used. However, due to the singular nature of the induction station and sortation system, the respective induction stations may form bottlenecks. Further, depending on a number of upstream processes, utilization of the different sortation systems may be non-uniform and/or suboptimal, where some sortation systems are used more heavily than others, resulting in bottlenecks at some or all of the induction stations.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Embodiments of the disclosure include interconnected sortation systems with multiple inputs (e.g., multiple induction stations, etc.) and multiple destinations (e.g., multiple sortation systems, etc.) that allow for more balanced throughput at the respective sortation systems, thereby reducing a likelihood of backups at induction stations, increasing uniformity of sortation system utilization, and increased overall throughput as a result of reduced item processing times. Embodiments include a plurality of induction stations that are coupled to a plurality of sortation systems, with a track coupling the various induction stations to the different sortation systems. The track may be reconfigurable to suit any number of configurations or placements of the various induction stations and/or sortation systems, and can be modularly expanded or contracted to accommodate systems of different sizes. As a result, an item inducted at any induction station can be dynamically routed to any sortation system, and is not required to be processed or sorted by any specific sortation system. In addition, items can be inducted at any one of a number of induction stations, thereby reducing the likelihood of a backup or delay at an induction stage of processing. Due to the interconnected nature of the system, induction times may be reduced, and items may be transported to a designated sortation system using one or more shuttles. Sortation systems may be intelligently selected by a controller based at least in part on factors such as sortation load (e.g., items waiting to be sorted by the sortation system, etc.), capacity (e.g., space available at the sortation system, etc.), distance between a particular induction station and a particular sortation system, shuttle availability, and/or other factors. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for interconnected sortation systems with multiple inputs and destinations is depicted in accordance with one or more embodiments of the disclosure. Although discussed in the context of online orders, other embodiments may be directed to any suitable use case where containers or items are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include one or more tracks for shuttles that may be used to guide shuttles from one location to another.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

Embodiments of the disclosure include systems and methods for interconnected sortation systems with multiple inputs and destinations. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
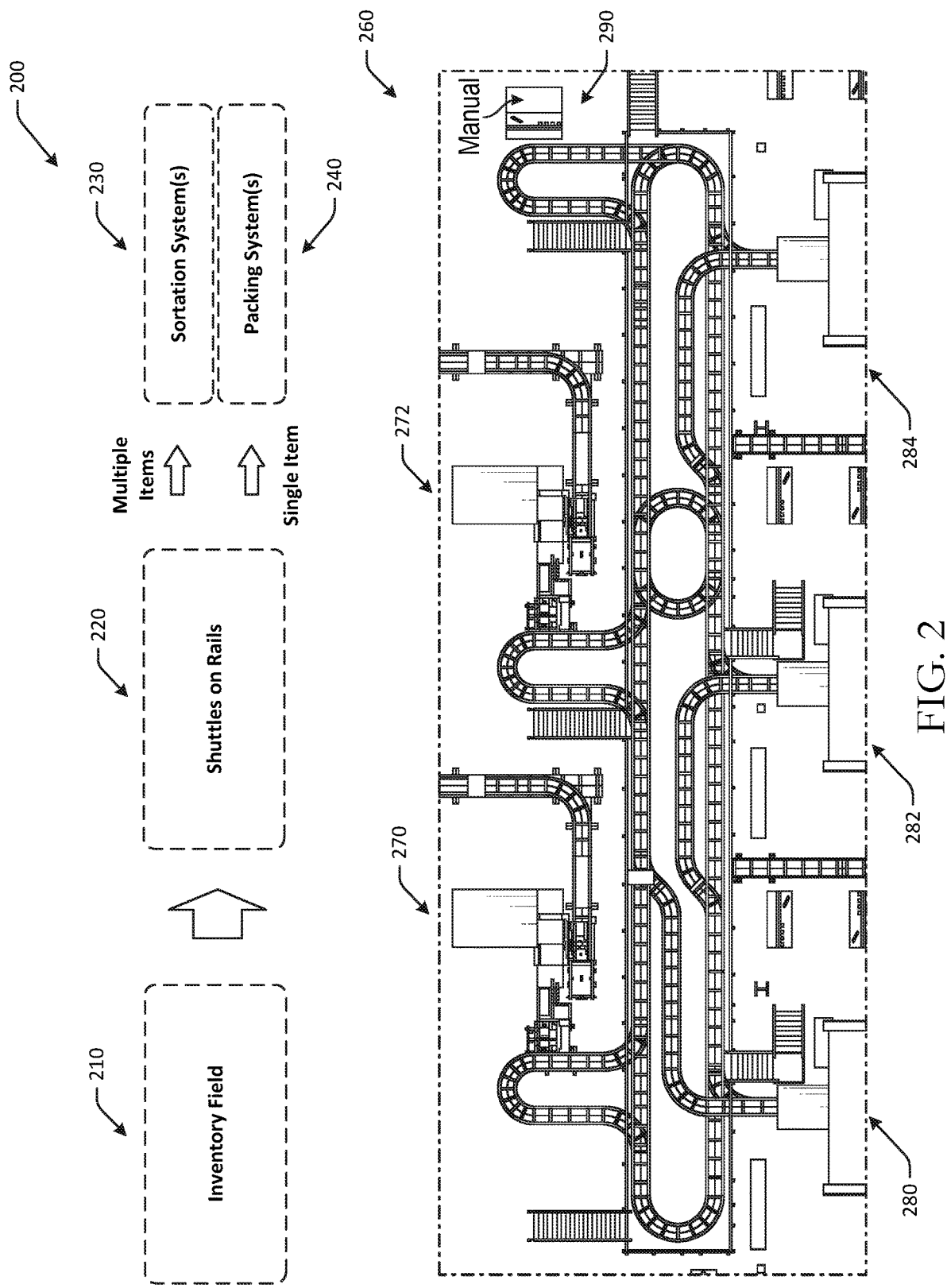
FIG. 2 is a schematic illustration of an example use case and facility layout for interconnected sortation systems with multiple inputs and destinations in accordance with one or more embodiments of the disclosure.

FIG. 2 is a schematic illustration of an example use case 200 and facility layout for interconnected sortation systems with multiple inputs and destinations in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using automated systems, or a combination thereof.

The picked products may be placed into one or more containers and the containers may be transported using one or more shuttles, such as one or more shuttles on rails 220, where the rails 220 form a track along which shuttles may move. The shuttles on rails 220 may include shuttles that are configured to transport items and/or containers from one location to another via rails. Some rails may include retractable rail components that allow for the shuttles to move from one set of rails to another. The shuttles on rails 220 may be used to transport containers from the inventory field 210 to one or more downstream processes, such as a sortation system 230, a packing system 240, etc. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a track that is used to interconnect a number of systems to each other. For example, the track may couple one or more induction stations to one or more sortation systems. The tracks may be used by shuttles to transport containers from one location to another. The track may include locations at which a shuttle can be directed to a straight path or to a loop, turn, oval, circle, and/or other geometries that involve a change in direction of a shuttle on the rails. The rail system 260 may include rails that link various systems, such as sortation systems, to each other and/or to other systems, such as container handling systems, manual induction systems, and so forth. For example, the rail system 260 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off of the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For instance, certain shuttles may include one or more magnets, such as permanent magnets, underneath the shuttle that interact with electromagnets disposed along a set of rails. The permanent magnet and electromagnets may work together to form a linear induction motor that propels the shuttle. In some instances, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
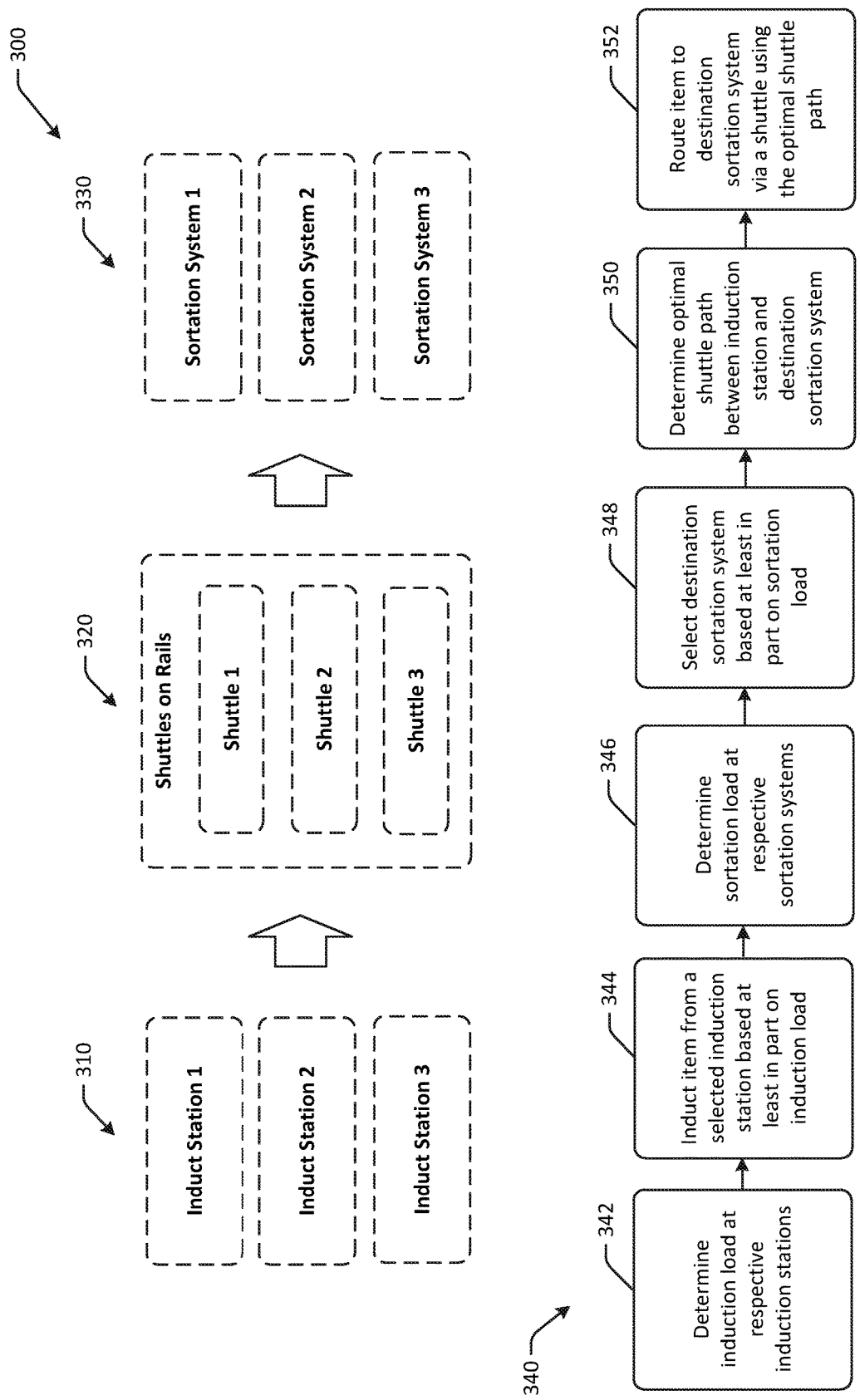
FIG. 3 is a schematic illustration of an interconnected sortation system with multiple inputs and multiple destinations, along with an example process flow, in accordance with one or more embodiments of the disclosure.

FIG. 3 is a schematic illustration of an example use case and facility layout for interconnected sortation systems with multiple inputs and destinations in accordance with one or more embodiments of the disclosure. Other embodiments may include additional or fewer components. The illustration of FIG. 3 is not to scale, and may not be illustrated to scale with respect to other figures. The system illustrated in FIG. 3 may include the same interconnected sortation systems with multiple inputs and destinations discussed with respect to FIGS. 1-2, and/or may be used with any of the systems described herein.

An interconnected system 300 may include one or more induction stations 310, such as a first induction station, a second induction station, a third induction station, and so forth. Any number of induction stations may be included. At the respective induction stations, items may be inducted into the interconnected system 300 for sortation and/or other downstream processes.

The interconnected system 300 may include one or more shuttles on rails 320. The shuttles on rails 320 may include one or more shuttles, such as a first shuttle, a second shuttle, and a third shuttle, etc. that move along rails that form a track. Any number of shuttles may be used. The track may connect the induction stations 310 to one or more sortation systems 330. The track may enable shuttles to transport items from any one of the induction stations 310 to any one of the sortation systems 330. The shuttles on rails 320 may be a track that is configured to provide continuous rail for movement of shuttles in an electromagnetically propelled shuttle-on-rail arrangement. Shuttle-on-rail arrangements may be used in many systems, such as sortation systems, pick systems, delivery systems, etc. The shuttles on rails 320 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance.

The interconnected system 300 may include one or more sortation systems 330, such as a first sortation system, a second sortation system, a third sortation system, and so forth. Any number of sortation systems may be included. Items may be unloaded from the shuttles at a destination sortation system 330 for sortation and/or for aggregation. For example, all of the items associated with a multiple-item order may be aggregated in a particular container at a sortation system. Once the container is full and/or the items in an order have been aggregated, the container in which the items are disposed may be removed from the sortation system and transported downstream using the shuttles for packing, etc.

To move along the track, the shuttles may include respective permanent magnets, and the interconnected system 300 may include a plurality of linear motors disposed along the track. The respective permanent magnets interact with the plurality of linear motors to propel the shuttles along the track. The track can include one or more paths, such as a plurality of paths, between the first induction station and the first sortation system.

The interconnected system 300 may include a computer system and/or another controller configured to route items from the induction stations 310 to the sortation systems 330 using the shuttles.

To manage shuttle movement and sortation load for optimal balance and maximum throughput, the controller may execute one or more process flows, such as one or more operations in example process flow 340. At block 342, the controller may determine an induction load at the respective induction stations 310. For example, the controller may determine a number of items waiting to be inducted at the different induction stations 310. The induction load may be the number of items queued for induction or en route to a particular induction station for induction into the interconnected system 300.

At block 344, the controller may induct an item from a selected induction station based at least in part on induction load. For example, the controller may determine an induction station with the highest induction load, and may route shuttles to that induction station to induct items, so as to reduce the likelihood of a backup or jam (e.g., bottleneck, etc.) due to overload at an induction station. In one example, the controller may determine that a first induction load at the first induction station is greater than a second induction load at the second induction station. The controller may therefore cause a first shuttle of the plurality of shuttles to be routed to the first induction station to retrieve a first item, and may cause a second shuttle of the plurality of shuttles to be routed to the first induction station to retrieve a second item.

At block 346, the controller may determine a sortation load at the respective sortation systems. For example, the controller may determine a sortation system with the lowest sortation load, and may route shuttles to that sortation system to sort items, so as to reduce the likelihood of a backup or jam (e.g., bottleneck, etc.) due to overload at a sortation system. In some instances, items that are part of a multi-item order may be destined for the same sortation system as the other items in the same order (e.g., subsequent items follow the initial item in an order, etc.).

At block 348, the controller may select a destination sortation system based at least in part on the sortation load. For example, the controller may route shuttles to sortation systems with relatively lower sortation loads, so as to maintain sortation balance across all of the sortation systems and to increase throughput. For example, the controller may be configured to determine that a first sortation load at the first sortation system is greater than a second sortation load at the second sortation system, and the controller may therefore determine that an item at the first induction section is to be routed to the second sortation system based at least in part on the second sortation load. In another example, the controller may determine that a first sortation load at the first sortation system is greater than a second sortation load at the second sortation system. The controller may therefore cause a first shuttle of the plurality of shuttles to be routed to the second sortation system to unload an item for sortation. Sortation system selection may also be determined based at least in part on a distance between the sortation system and a particular induction station, a time to travel the distance, a number of active shuttles, and/or other factors.

At block 350, the controller may determine an optimal shuttle path between an induction station and the selected destination sortation system. The optimal path may be the shortest path, the quickest path, the path with the least obstacles, and/or a combination thereof. For example, the controller may determine traffic patterns of other active shuttles, shuttle merging times, and/or other factors to determine an optimal path. The controller may determine a first optimal path along the track for a first shuttle, and may then determine a second optimal path along the track for a second shuttle based at least in part on the first optimal path (e.g., paths of other shuttles may be considered when determining optimal paths for a particular shuttle, etc.). In some embodiments, the controller may determine a first shuttle launch time for a first shuttle of the plurality of shuttles, and may determine a second shuttle launch time for a second shuttle of the plurality of shuttles based at least in part on the first shuttle launch time and a shuttle position of a third shuttle of the plurality of shuttles. The shuttle launch times may be part of the optimal path determination, as shuttle launch times may affect the time it takes for a shuttle to travel between an induction station and a destination sortation system.

At block 352, the controller may route the item to the destination sortation system via a shuttle using the optimal shuttle path. The shuttle may be deployed and may deliver the item to the sortation system. The shuttle may then return to an induction station to retrieve another item. In this manner, induction loads and sortation loads can be managed across an entire system, bottlenecks can be reduced, and throughput can be increased.

Figure 4:
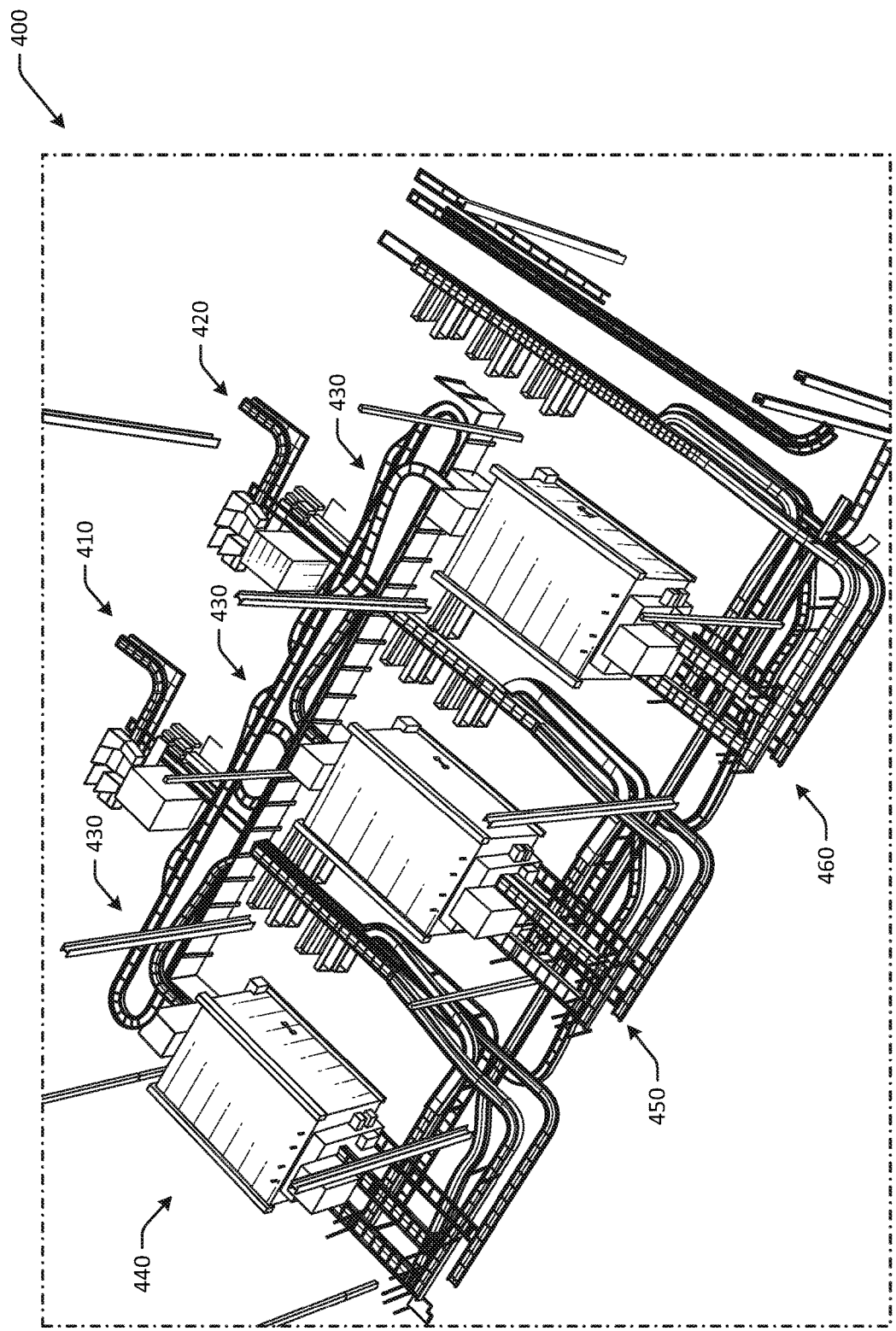
FIG. 4 is a schematic illustration of an interconnected sortation system with multiple inputs and multiple destinations in accordance with one or more example embodiments of the disclosure.

FIG. 4 is a schematic illustration of an interconnected sortation system 400 with multiple inputs and multiple destinations in accordance with one or more example embodiments of the disclosure. Other embodiments may include additional or fewer components. The illustration of FIG. 4 is not to scale, and may not be illustrated to scale with respect to other figures. The system illustrated in FIG. 4 may include the same system components discussed with respect to FIGS. 1-3.

In FIG. 4, the interconnected sortation system 400 may allow for multiple machines to be connected together. The interconnected sortation system 400 may include a track 430 that connects multiple machines together, where the track 430 may include multiple merging sections and/or diverging sections. For example, the track 430 may connect a first induction station 410 to a second induction station 420. Any number of induction stations may be included. The track 430 may connect one or both the first induction station 410 and the second induction station 420 to one or more, or all, of a first sortation system 440, a second sortation system 450, and/or a third sortation system 460. Any number of sortation systems may be included. The track 430 may include one or more paths between the first induction station 410 and any individual one of the sortation systems. In some embodiments, the track 430 may form more than one route to a specific sortation system from a particular induction station.

The interconnected sortation system 400 may therefore include the first sortation system 440 and the second sortation system 450. The interconnected sortation system 400 may include the first induction station 410 at which first items can be inducted. The interconnected sortation system 400 may include the second induction station 420 at which second items can be inducted. The interconnected sortation system 400 may include the track 430 that may be configured to connect the first sortation system 440 to both the first induction station 410 and the second induction station 420, and to connect the second sortation system 450 to both the first induction station 410 and the second induction station 420. The interconnected sortation system 400 may include one or more, such as a plurality, of shuttles configured to move along the track 430. The track 430 may be optionally configured to connect the first sortation system 440 to the second sortation system 450, and to connect the first induction station 410 to the second induction station 420.

The interconnected sortation system 400 may therefore provide the ability to automate induct and sortation processes that uses a shuttle merge and sorter that connects sortation systems with item induction lanes. The interconnected sortation system 400 may therefore consolidate the discrete sortation processes, thereby removing the need for separate pick paths, and also providing a compact footprint and increased throughput due to interconnected systems that allow for load balancing.

Figure 5:
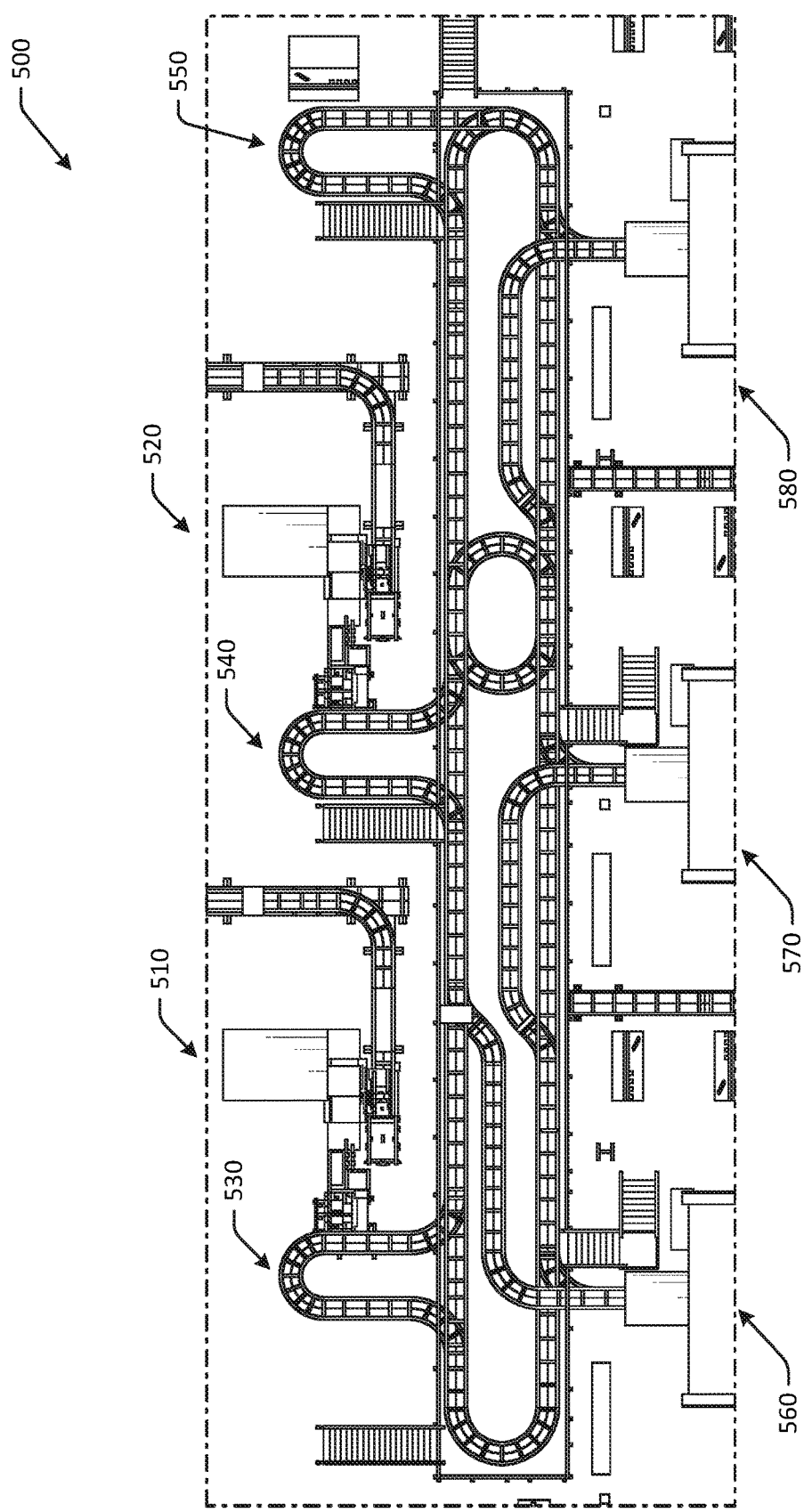
FIG. 5 is a schematic illustration of a top view of a track connecting sortation systems with multiple inputs and multiple destinations in accordance with one or more embodiments of the disclosure.

FIG. 5 is a schematic illustration of a top view of an interconnected system 500 having a track connecting sortation systems with multiple inputs and multiple destinations in accordance with one or more embodiments of the disclosure. Other embodiments may include additional or fewer components. The illustration of FIG. 5 is not to scale, and may not be illustrated to scale with respect to other figures. The system illustrated in FIG. 5 may include the same shuttles discussed with respect to FIGS. 1-4.

The interconnected system 500 may include a first sortation system 560 having a first container matrix. The first sortation system 560 may be configured to sort items into containers disposed in the first container matrix, where one or more containers, such as a first container and a second container, are disposed in the first container matrix. The interconnected system 500 may include a second sortation system 570 having a second container matrix. The second sortation system 570 may be configured to sort items into containers disposed in the second container matrix, where one or more containers, such as a third container and a fourth container, are disposed in the second container matrix. The interconnected system 500 may include a third sortation system 580 having a third container matrix. The third sortation system 580 may be configured to sort items into containers disposed in the third container matrix, where one or more containers, such as a fifth container and a sixth container, are disposed in the third container matrix. Any number of sortation systems may be included.

The interconnected system 500 may include one or more induction stations disposed upstream of the first sortation system 560, the second sortation system 570, and the third sortation system 580. For example, the interconnected system 500 may include a first induction station 510 disposed upstream of the first sortation system 560, the second sortation system 570, and the third sortation system 580. The first induction station 510 may be configured to induct items into the interconnected system 500. The interconnected system 500 may include a second induction station 520 disposed upstream of the first sortation system 560, the second sortation system 570, and the third sortation system 580. The second induction station 520 may be configured to induct items into the interconnected system 500.

The interconnected system 500 may include a track that connects one or more of the first induction station 510, the second induction station 520, the first sortation system 560, the second sortation system 570, and/or the third sortation system 580. The track depicted in the example of FIG. 5 provides interconnectivity between the different components of the interconnected system 500. The track may include portions such as a first scanning tunnel 530, a second scanning tunnel 540, a manual induction, maintenance, and/or exception handling loop 550, and/or other portions. The track may form one or more paths between the different components of the interconnected system 500. The track may optionally form a plurality of paths between the first induction station 510 and the first sortation system 560. The track may form a closed loop track, and may optionally include a maintenance loop.

The interconnected system 500 may include one or more shuttles that move along the track to transport items between the induction stations and sortation systems. The shuttles may move along specific paths formed by the track. In some embodiments, the shuttles may be routed along optimal paths formed by the track to route items to specific sortation systems.

For example, the interconnected system 500 may include a first shuttle configured to receive items from the first induction station 510 and the second induction station 520. The first shuttle may be a non-captive shuttle configured to access the first sortation system 560, the second sortation system 570, and the third sortation system 580 using the track. The interconnected system 500 may include a second shuttle configured to receive items from the first induction station 510 and the second induction station 520. The second shuttle may also be a non-captive shuttle configured to access the first sortation system 560, the second sortation system 570, and the third sortation system 580 using the track.

The interconnected system 500 may include a controller configured to route items from the first induction station 510 and the second induction station 520 to the first sortation system 560, the second sortation system 570, and the third sortation system 580 using the first shuttle and the second shuttle. The controller may be configured to direct the shuttles along particular paths formed by the track.

In one embodiment, items can be picked to totes, and the totes or individual items can be loaded onto shuttles. Individual shuttles may merge on to a shuttle highway (e.g., the track, etc.). The track may include multiple merges and diverts for different induction stations and sortation systems. The controller of the system may determine optimal paths and manage shuttle traffic. Once the shuttle reaches the destination sortation system, a lift may move the shuttle vertically to the destination level. The shuttle can then traverse through a central spine of the sortation system to a destination container and can drop the item using an onboard conveyor. Full containers may be removed from the sortation system using a shuttle and sent downstream for packing. Empty containers can be used to replace removed full containers.

Figure 6A:
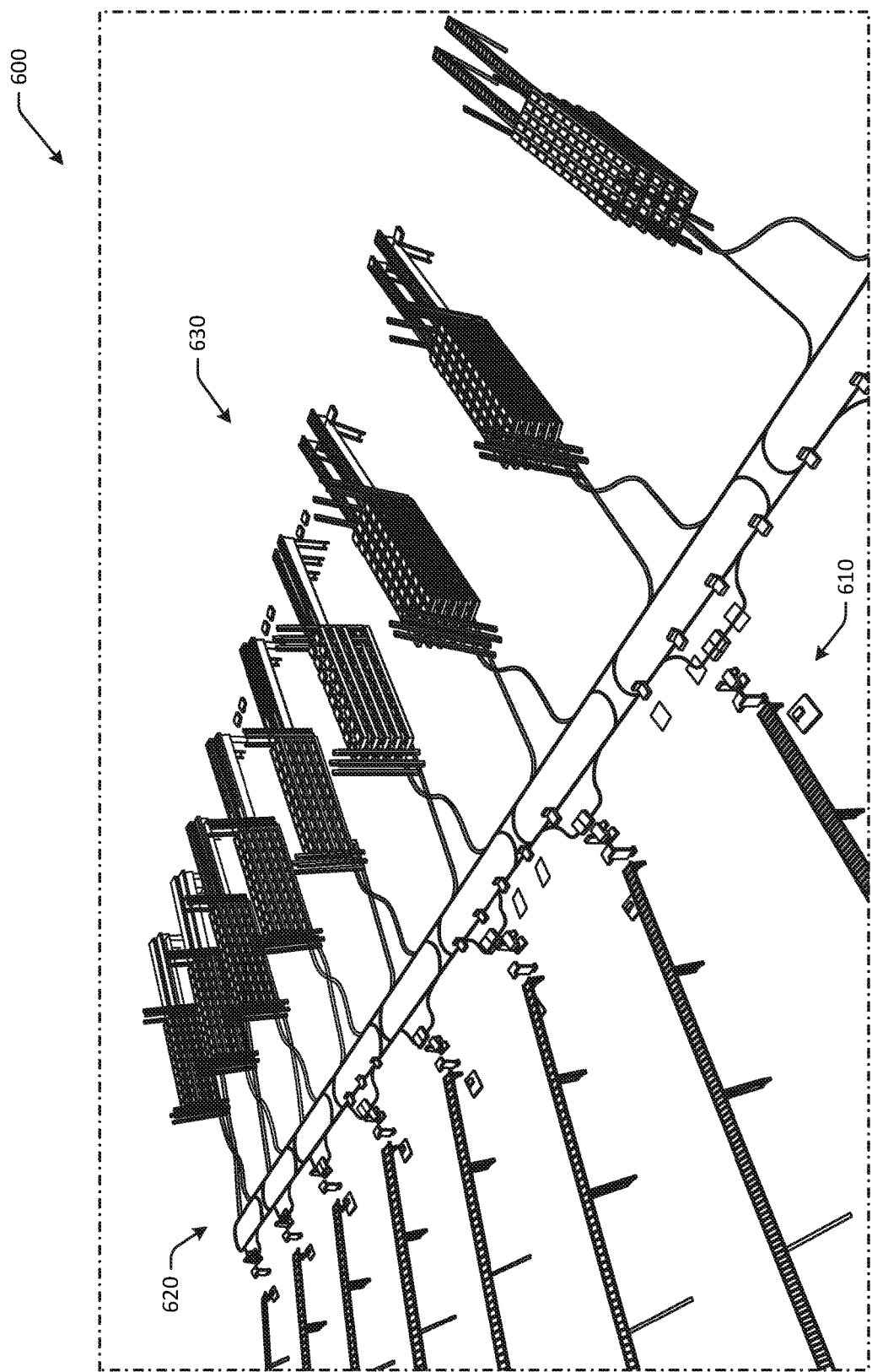
FIGS. 6A-6B schematically illustrate a number of induction stations and a number of sortation systems connected via a track in accordance with one or more embodiments of the disclosure.
Figure 6B:
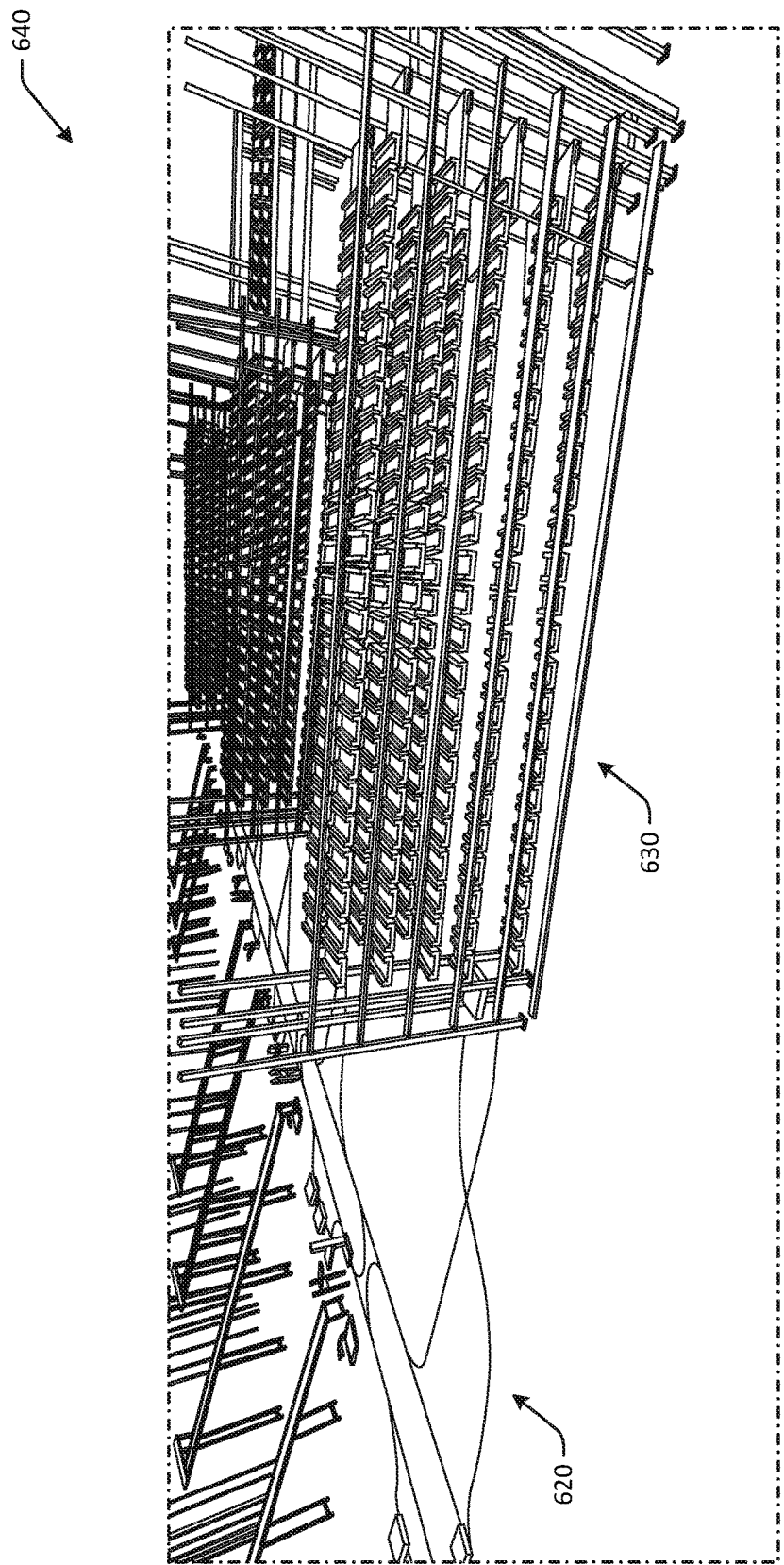

FIGS. 6A-6B schematically illustrate a number of induction stations and a number of sortation systems connected via a track in accordance with one or more embodiments of the disclosure. Other embodiments may include additional or fewer components. The illustration of FIGS. 6A-6B are not to scale, and may not be illustrated to scale with respect to other figures. The system illustrated in FIGS. 6A-6B may be the same system discussed with respect to FIGS. 1-5.

In FIG. 6A, a number of induction stations 610 are coupled to a number of sortation systems 630 via a track 620. Shuttles may move along the track 620 to transport items from the induction stations 610 to the sortation systems 630. Items may flow to the induction stations 610 from inventory processes upstream. In FIG. 6B, the sortation systems 630 are depicted in a close-up perspective view 640. Items may be transported from the induction stations 610 via shuttles that move along the track 620 to the various sortation systems 630.

When a shipment opener is first inducted (e.g., the first item of an order that has multiple items, etc.), a controller in communication with the system may execute a chute assignment algorithm to determine which chute and/or which sortation system the order is to be assigned to. For all subsequent items in the order, the items may be routed to the same chute, such that all items are aggregated in the same container. After dropping an item off, when an empty shuttle is about to reenter the track, the controller may perform one or more calculations to determine which induction station the shuttle is to return to in order to retrieve another item.

Some embodiments may include a shuttle parking buffer as part of the track that shuttles can divert to if the buffer at the induction stations is full, as is the buffer between the sortation systems and the track. If a parking buffer is not used, then the shuttle can simply remain on the track until space opens up at the induct station, and the sortation system return path can hold any subsequent shuttles. The track may include one or more shortcuts that enable shuttles to divert off the main straightaways and merge back onto the track, cutting down on travel time and/or distance. Shuttles can use the shortcuts if there is space available for them to enter. Merges and diverts can be controlled via a system controller. Shuttles aiming to enter the track can do so immediately if there is ample space on the track. Otherwise, shuttles may be paused and a timer may be initiated. Once the timer expires or there is space to enter, the merge can be locked to allow the shuttle to enter, along with any other shuttles that may have buffered behind it, for a set amount of time (or once no more shuttles are left to merge), before the merge will again switch to allow for straightaway traffic.

Figure 7:
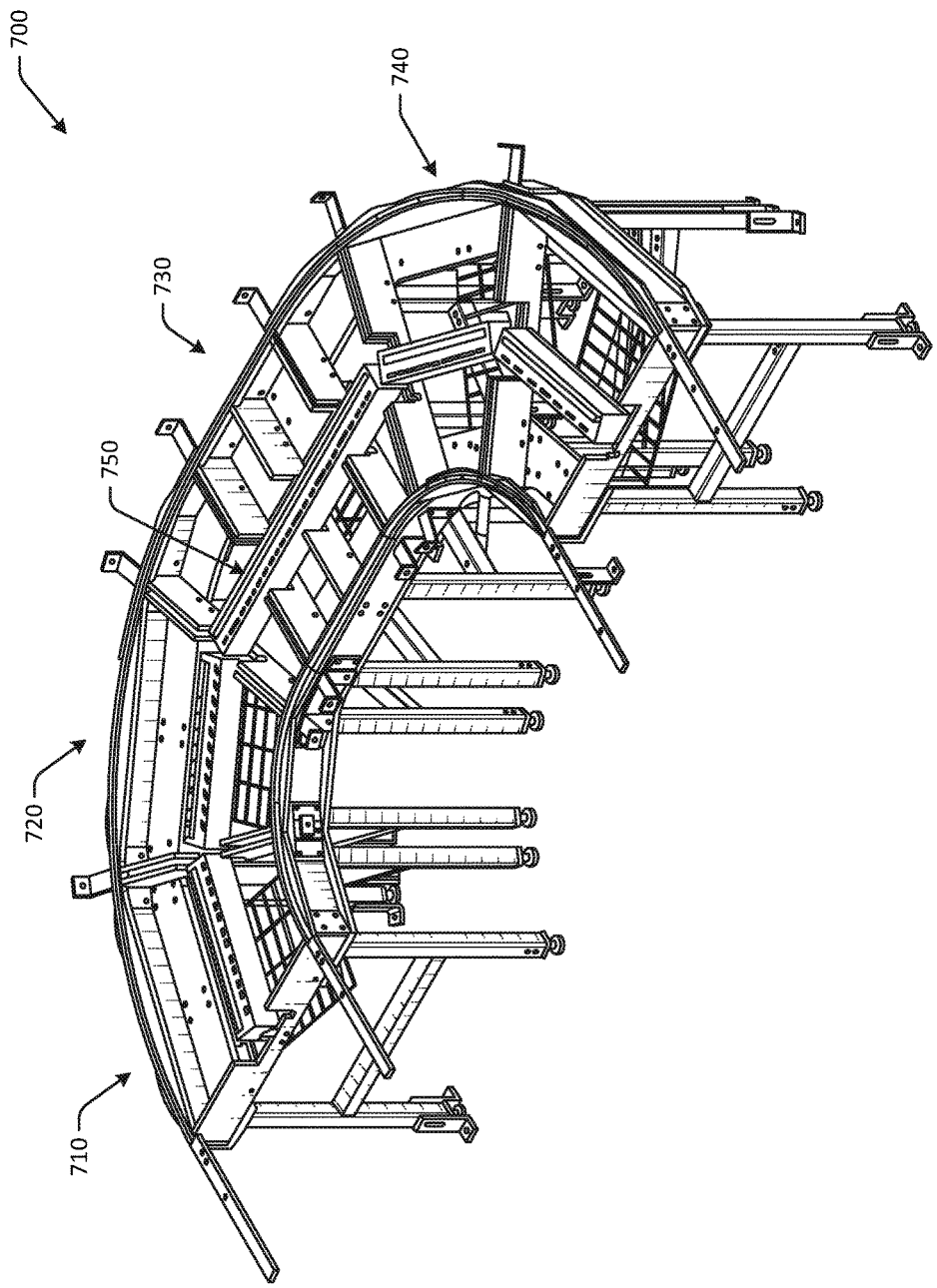
FIG. 7 is a schematic illustration of a portion of a track used to connect induction stations and sortation systems in accordance with one or more embodiments of the disclosure.

FIG. 7 is a schematic illustration of a portion of a track 700 used to connect induction stations and sortation systems in accordance with one or more embodiments of the disclosure. Other embodiments may include additional or fewer components. The illustration of FIG. 7 is not to scale, and may not be illustrated to scale with respect to other figures. The track illustrated in FIG. 7 may be the same track discussed with respect to FIGS. 1-6.

In FIG. 7, a portion of the track 700 forming a U-shaped curve is depicted. The track 700 may include one or more linear sections, curved sections, loop sections, oval sections, and/or other sections that interconnect at least one induction station to one or more sortation systems. In some embodiments, the track 700 may include paths that connect multiple induction stations to a sortation system, as well as a single induction station to multiple sortation systems. Other configurations may be used.

The track 700 may include a first angled portion 710 and a second angled portion 720 that are disposed between a first linear portion and a second linear portion 730 that allow for a shuttle to turn about 90 degrees (e.g., a right hand turn depending on the direction of travel in the depicted example, etc.). Additional angled portions 740 may be used to form a U-shaped curve to allow for a reverse in shuttle direction. Other curves may be formed using linear and angled portions of tracks. The track 700 may therefore include one or more curved sections or curved portions that are configured to turn a shuttle from a first direction to a second direction that is opposite the first direction. In some embodiments, shuttles may be configured to move uni-directionally along the track 700. In other embodiments, some shuttles may be configured to move bi-directionally along some or all of the track 700. The track 700 may form a plurality of paths between a first induction station and a first sortation system. The track 700 may form a closed loop track, and may optionally include a maintenance loop. The track 700 may be reconfigurable to suit any number of configurations or placements of the various induction stations and/or sortation systems, and can be modularly expanded or contracted to accommodate systems of different sizes. For example, one or more linear sections and/or angled sections may be used to modify the configuration of the track 700.

The shuttles may include respective permanent magnets, and the system may include one or more linear motors 750 disposed along the track 700. The permanent magnets may interact with the electromagnets or linear motors 750 to propel the shuttles. The linear motors 750 may be coupled to individual sections of the track 700, allowing for modular configuration of the track 700. Any number of paths can be formed to interconnect any number of induction stations and sortation systems, and in some instances, more than one path may be used to connect a particular induction station to a particular sortation system.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
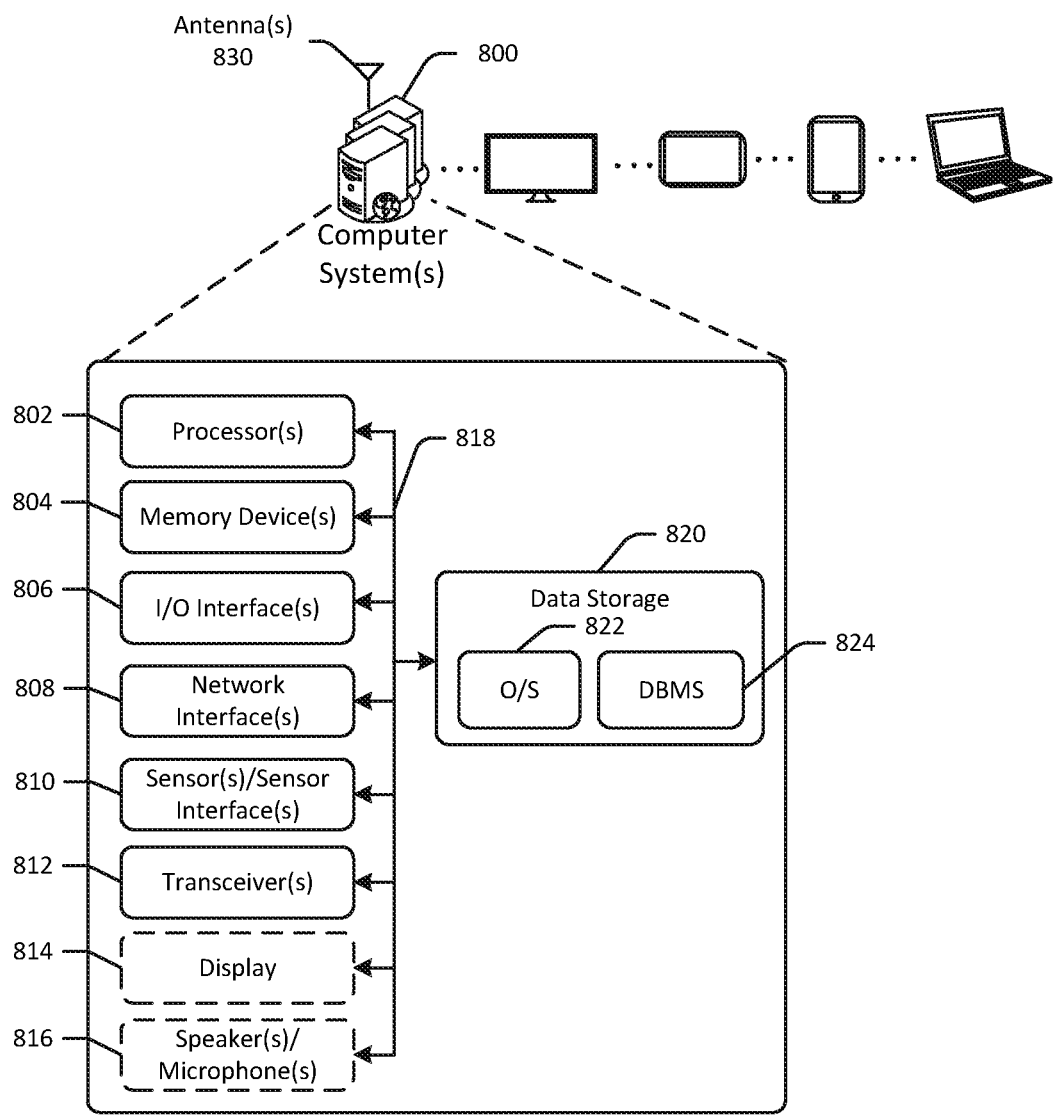
FIG. 8 schematically illustrates an example architecture of a computer system associated with a system in accordance with one or more embodiments of the disclosure.

FIG. 8 is a schematic block diagram of one or more illustrative computer system(s) 800 associated with a shuttle rail system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) of the shuttle system discussed with reference to FIGS. 1-7. For example, the computer system(s) 800 may be a controller and may control one or more aspects of the shuttle systems described in FIGS. 1-7.

The computer system(s) 800 may be configured to communicate with one or more servers, user devices, or the like. The computer system(s) 800 may be configured to control rail switches, identify shuttles, direct shuttles, move shuttles, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s)

830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the 0/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a first sortation system comprising a first container matrix, the first sortation system configured to sort items into containers disposed in the first container matrix, wherein a first container and a second container are disposed in the first container matrix;
   a second sortation system comprising a second container matrix, the second sortation system configured to sort items into containers disposed in the second container matrix, wherein a third container and a fourth container are disposed in the second container matrix;
   a first induction station disposed upstream of the first sortation system and the second sortation system, wherein the first induction station is configured to induct items into the system;
   a second induction station disposed upstream of the first sortation system and the second sortation system, wherein the second induction station is configured to induct items into the system;
   a track coupled to the first sortation system, the second sortation system, the first induction station, and the second induction station;
   a first shuttle configured to receive items from the first induction station and the second induction station, wherein the first shuttle is a non-captive shuttle configured to access both the first sortation system and the second sortation system using the track;
   a second shuttle configured to receive items from the first induction station and the second induction station, wherein the second shuttle is a non-captive shuttle configured to access both the first sortation system and the second sortation system using the track; and
   a controller configured to:
      determine that a first sortation load at the first sortation system is greater than a second sortation load at the second sortation system;
      determine that a first item at the first induction station is to be routed to the second sortation system based at least in part on the second sortation load; and
      route the first item to the second sortation system using the first shuttle.

2. The system of claim 1, wherein the controller is further configured to:
   determine that a first induction load at the first induction station is greater than a second induction load at the second induction station;
   cause the first shuttle to be routed to the first induction station to retrieve a first item; and
   cause the second shuttle to be routed to the first induction station to retrieve a second item.

3. The system of claim 1, wherein the first shuttle and the second shuttle comprise respective permanent magnets, the system further comprising:
   a plurality of linear motors disposed along the track, wherein the respective permanent magnets interact with the plurality of linear motors to propel the first shuttle and the second shuttle along the track; and
   wherein the track is reconfigurable and comprises a plurality of paths between the first induction station and the first sortation system.

4. A system comprising:
   a first sortation system;
   a second sortation system;
   a first induction station to induct items into the system;
   a second induction station to induct items into the system;
   a track configured to connect the first sortation system to both the first induction station and the second induction station, and to connect the second sortation system to both the first induction station and the second induction station;
   a plurality of shuttles configured to move along the track; and
   a controller configured to route items from the first induction station and the second induction station to the first sortation system and the second sortation system using the plurality of shuttles, wherein the controller is configured to:
      determine that a first sortation load at the first sortation system is greater than a second sortation load at the second sortation system; and
      determine that an item at the first induction section is to be routed to the second sortation system based at least in part on the second sortation load.

5. The system of claim 4, wherein the controller is further configured to:
determine that a first induction load at the first induction station is greater than a second induction load at the second induction station;
cause a first shuttle of the plurality of shuttles to be routed to the first induction station to retrieve a first item; and
cause a second shuttle of the plurality of shuttles to be routed to the first induction station to retrieve a second item.

6. The system of claim 5, wherein the controller is further configured to:
determine a first optimal path along the track for the first shuttle; and
determine a second optimal path along the track for the second shuttle based at least in part on the first optimal path.

7. The system of claim 4, wherein the controller is further configured to:
determine a first shuttle launch time for a first shuttle of the plurality of shuttles; and
determine a second shuttle launch time for a second shuttle of the plurality of shuttles based at least in part on the first shuttle launch time and a shuttle position of a third shuttle of the plurality of shuttles.

8. The system of claim 4, wherein the track comprises a plurality of curved sections configured to turn a shuttle of the plurality of shuttles from a first direction to a second direction that is opposite the first direction; and
wherein the track is reconfigurable based on placement of the first induction station, the second induction station, the first sortation system, or the second sortation system.

9. The system of claim 4, wherein the plurality of shuttles move uni-directionally along the track.

10. The system of claim 4, wherein the first sortation system comprises a first container matrix and is configured to sort items into containers disposed in the first container matrix; and
wherein the second sortation system comprises a second container matrix and is configured to sort items into containers disposed in the second container matrix.

11. The system of claim 4, wherein the plurality of shuttles comprises respective permanent magnets, the system further comprising:
a plurality of linear motors disposed along the track, wherein the respective permanent magnets interact with the plurality of linear motors to propel the shuttles;
wherein the track comprises a plurality of paths between the first induction station and the first sortation system.

12. The system of claim 4, wherein the track is further configured to connect the first sortation system to the second sortation system, and to connect the first induction station to the second induction station.

13. The system of claim 4, wherein the track is a closed loop track, and wherein the track comprises a maintenance loop.

14. The system of claim 4, wherein the plurality of shuttles comprises respective permanent magnets, the system further comprising:
a plurality of linear motors disposed along the track, wherein the respective permanent magnets interact with the plurality of linear motors to propel the shuttles;
wherein the track comprises a plurality of paths between the first induction station and the first sortation system.

15. A system for routing shuttles, the system comprising:
a plurality of sortation systems configured to sort items;
a plurality of induction stations to induct items into the system;
a reconfigurable track configured to connect the plurality of sortation systems to the plurality of induction stations;
a plurality of shuttles configured to move along the reconfigurable track; and
a controller configured to route items from the plurality of induction stations to the plurality of sortation systems using the plurality of shuttles, wherein the controller is further configured to:
determine that a first induction load at the first induction station is greater than a second induction load at the second induction station;
cause a first shuttle of the plurality of shuttles to be routed to the first induction station to retrieve a first item; and
cause a second shuttle of the plurality of shuttles to be routed to the first induction station to retrieve a second item.

16. The system of claim 15, wherein the controller is further configured to:
determine a first optimal path along the track for the first shuttle; and
determine a second optimal path along the track for the second shuttle based at least in part on the first optimal path.

17. The system of claim 15, wherein the controller is further configured to:
determine that a first sortation load at the first sortation system is greater than a second sortation load at the second sortation system; and
determine that an item at the first induction section is to be routed to the second sortation system based at least in part on the second sortation load.

18. The system of claim 15, wherein the reconfigurable track comprises a plurality of curved sections configured to turn a shuttle of the plurality of shuttles from a first direction to a second direction that is opposite the first direction; and
wherein the track is reconfigurable based on placement of the first induction station, the second induction station, the first sortation system, or the second sortation system.

19. The system of claim 15, wherein the plurality of shuttles move uni-directionally along the track.

20. The system of claim 15, wherein the first sortation system comprises a first container matrix and is configured to sort items into containers disposed in the first container matrix; and
wherein the second sortation system comprises a second container matrix and is configured to sort items into containers disposed in the second container matrix.

* * * * *